United States Patent
de Groot et al.

(12)

(10) Patent No.: US 11,091,628 B2
(45) Date of Patent: Aug. 17, 2021

(54) FILLING COMPOSITION FOR CABLES

(71) Applicant: Kraton Polymers LLC, Houston, TX (US)

(72) Inventors: Hendrik de Groot, Almere (NL); Mark Govert Kalisvaart, Amsterdam (NL); Robert Bening, Houston, TX (US); Huixian Yang, Shanghai (CN)

(73) Assignee: Kraton Polymers LLC, Houston, TX (US)

( * ) Notice: Subject to any disclaimer, the term of this patent is extended or adjusted under 35 U.S.C. 154(b) by 106 days.

(21) Appl. No.: 16/528,819

(22) Filed: Aug. 1, 2019

(65) Prior Publication Data

US 2020/0056035 A1 Feb. 20, 2020

Related U.S. Application Data

(60) Provisional application No. 62/718,432, filed on Aug. 14, 2018.

(51) Int. Cl.
*C08L 53/02* (2006.01)
*C08K 5/01* (2006.01)
*H01B 13/32* (2006.01)

(52) U.S. Cl.
CPC .............. *C08L 53/025* (2013.01); *C08K 5/01* (2013.01); *H01B 13/321* (2013.01)

(58) Field of Classification Search
CPC ... C08L 53/025; C08L 91/00; C08L 2203/202
See application file for complete search history.

(56) References Cited

U.S. PATENT DOCUMENTS

| 2015/0275065 A1 | 10/2015 | Murphy et al. |
| 2016/0362593 A1 | 12/2016 | Bening et al. |
| 2018/0016413 A1* | 1/2018 | Bening .................. C08L 53/02 |
| 2020/0276354 A1* | 9/2020 | Dubois .................. C08L 23/20 |

FOREIGN PATENT DOCUMENTS

| KR | 10-2011-0132763 A | 12/2011 |
| WO | 2015/119811 A1 | 8/2015 |
| WO | 2018/013853 A1 | 1/2018 |
| WO | 2018/221661 A1 | 12/2018 |

* cited by examiner

*Primary Examiner* — Jeffrey C Mullis

(57) ABSTRACT

A filling composition is disclosed, the composition comprises (i) between 4 to 20 wt. % of a selectively hydrogenated isoprene-styrene block copolymer having a structure S-EP with at least 40 wt. % polystyrene content, a total diblock apparent molecular weight of at least 160 kg/mole, the polystyrene block S has a true molecular weight in the range of 60 to 110 kg/mole, and the polyisoprene block (EP) has a molecular weight in the range of 80-100 kg/mole, (ii) an oil, and (iii) optional additives. The filling composition is characterized as having a thixotropic ratio of 2-10, a drop point of at least 200° C., and a cone penetration at 25° C. of <500 dmm.

14 Claims, No Drawings

FILLING COMPOSITION FOR CABLES

RELATED APPLICATIONS

This application claims priority from U.S. Provisional Application No. 62/718,432, with a filing date of Aug. 14, 2018, the entire disclosures of which is incorporated herein by reference for all purposes.

FIELD

This disclosure relates to filling compositions for use in cables and methods thereof.

BACKGROUND

Telecommunication cables (e.g., optical fiber cables) are subjected to stresses during their manufacture, installation, and/or operation that may compromise their intended function. Additionally, to ensure uninterrupted connection, the cables need to resist and remain protected from water access that often leads to signal loss or attenuation. In optical fiber cables, a plurality of cables are enclosed together in an extended plastic tube. Reinforcing and or protective materials can be introduced in the form of a filling composition serving to mitigate the effects of the stresses on the material's intended function. The filling composition also functions to protect both the structural and functional integrity of the optical cables. As another example, post-tensioning cables used in the concrete reinforcement often contain a plurality of wires that can be protected utilizing a filling composition.

There is a need for improved filling compositions to protect the structural and functional integrity of optical fiber cables, with utility in other applications as well.

SUMMARY

In an aspect, a filling composition for cables is disclosed. The filling composition comprises: a selectively hydrogenated isoprene-styrene block copolymer having a structure S-EP with at least 40 wt. % polystyrene content (PSC), a total diblock apparent molecular weight of at least 160 kg/mole, the polystyrene block S has a true molecular weight in the range of 60 to 110 kg/mole, and the polyisoprene block (EP) has a true molecular weight in the range of 80-100 kg/mole; an oil; optionally additives. The filling composition is characterized as having a thixotropic ratio of 2-10, a drop point of at least 200° C., and a cone penetration at 25° C. of less than 350 dmm.

In a second aspect, the filling composition comprises a selectively hydrogenated isoprene-styrene block copolymer having a structure S-EP, with the polystyrene block S having a true MW of 70-75 kg/mole and a PSC ranging from 42-45 wt. %.

DESCRIPTION

The following terms used the specification and will have the following meanings:

"Cables" or "cable" refers in general to cables for use in construction (e.g., bridges, concrete structures) as well electrical and/or optical equipment in the form of cables, connectors, plus, and assemblies thereof.

Oil separation herein refers to the phenomenon of static oil bleed or oil puddling where oil is released from a thickening matrix associated with a grease, where a grease herein refers to an oily material.

Drop point refers to the temperature at which an oleaginous material passes from a semi-solid to a liquid state under specific test conditions.

Molecular weights are polystyrene equivalent molecular weights and can be measured by Gel Permeation Chromatography (GPC), with values representing the molecular weight at the peak of the distribution.

The disclosure relates to a filling composition that combines optimal application and service temperatures, viscosity consistency and excellent oil retention for cables, e.g., as rubbery compounds for use in copper cables or shear-thinning greases for optical fiber cables, with consistent viscosity at increased shear rates. The filling composition comprises: i) a styrenic block copolymer, ii) an oil and optionally iii) additives.

Styrenic Block Copolymer (SBC) Component:

The SBC is a selectively hydrogenated isoprene-styrene block copolymer having a structure S-EP with at least 40 wt. % polystyrene content (PSC), preferably 40 to 50 wt. % polystyrene content, a polystyrene block true molecular weight of at least 60 kg/mole, and a total diblock apparent molecular weight of at least 160 kg/mole.

In embodiments, the polystyrene block (S) has a true molecular weight in the range of 60 to 110 kg/mole, 65 to 105 kg/mole, 70 to 100 kg/mole, 85-95 kg/mole, or 65-75 kg/mole. In embodiments, the polyisoprene block (EP) has a true molecular weight in the range of 80-100 kg/mole, 85-95 kg/mole, at least 80 kg/mole, or 90-110 kg/mole. In embodiments, the polystyrene content is in the range of 42-46 wt. % or 44-48 wt. %, or at least 45 wt. %. The total diblock apparent molecular weight is the range of 160 to 360 kg/mole, 160 to 340 kg/mole, or 200 to 320 kg/mole.

In some embodiments, the SBC is characterized as having a polystyrene block S with a true MW of 70-75 kg/mole and a PSC ranging from 42-45 wt. %. In embodiments, the SBC can be dissolved in oil at a temperature of less than 185° C., or less than 150° C., or in the range of 125-145° C., allowing the use of lower cost oils.

The SBC can be prepared by contacting the monomer or monomers with an organoalkali metal compound in a suitable solvent at a temperature range of from −150° to 300° C., preferably at a temperature range of 0 to 100° C. The selective hydrogenation is carried out under conditions such that at least 90 mol %, or at least 95%, or at least 98% of the isoprene double bonds have been reduced, and between 0 and 10 mol % of the arene double bonds present in the polymerized styrene units have been reduced. The methods operate to hydrogenate polymers containing aromatic or ethylenic unsaturation and are based upon operation of a suitable catalyst, based on nickel, cobalt or titanium.

The SBC is used in the filling composition in an amount ranging from 4-20 wt. % based on the total weight of the filling composition, alternatively from 6 to 15 wt. %, and alternatively from 8 wt. % to 12 wt. %.

In some embodiments, the filling composition is formed with an additional styrenic polymer (i.e., other than the SBC of the type disclosed herein), such as a styrene-ethylene/propylene block copolymer SEPS, or hydrogenated, controlled distribution S-EB/S or S-EB/S-S or (S-EB/S)nX where X is the remnant of a coupling agent, or an SEB block copolymer, with the S block comprises any of styrene, alpha-methylstyrene, para-methylstyrene, vinyl toluene, vinylnaphthalene, diphenyl ethylene, para-butyl styrene, or mixtures thereof; the B block comprising any of a conjugated 1,3-butadiene or conjugated substituted butadienes such as piperylene, 2,3-dimethyl-1,3-butadiene, and 1-phenyl-1,3-butadiene, or mixtures thereof and/or mixtures in conjunction with isoprene. The ratio of the SBC to the additional styrenic polymer ranging from 50:50 to 90:10.

Oil Component:

The filling composition further contains an oil, selected from any of a paraffinic oil, an oil-enriched in paraffin, a mineral oil, a GTL-based process oil (or Fischer-Tropsch derived oil), a synthetic oil, or mixtures thereof. Examples of suitable oil include paraffins having an average number of carbon atoms ranging from 16 to 30, or chemically inert oil composed mainly of linear, branched, and cyclic alkanes (paraffins) of various molecular weights. In one embodiment, the oil is a Group II mineral oil having a viscosity index (VI) in the range of 80-120. Examples of commercially suitable oils include alpha olefins such as AlphaPlus, a Group II oil from Handi Sunshine, a Group II oil from ExxonMobil such as PRIMOL 352, and Shell's GTL Risella X420.

The oil of the type disclosed herein (e.g., paraffinic, mineral, Group II, GTL, etc.) is present in the filling composition in an amount of from 80 wt. % to 96 wt. % based on the total weight of the gel composition. In one embodiment, the oil is a Group II base oil having more than 90 percent saturates, less than 0.03 percent sulfur and with a viscosity index of 80 to 120.

In some embodiment, a second (different) oil can be added in an amount of 0-30 wt. %, e.g., a polybutene oil having a molecular weight of at least 900.

Optional Additives:

The filling composition can comprise various additives to meet one or more user and/or process goals. The additives can also be used to modify one or more properties of the filling composition. Examples include colorimetric indicators, corrosion inhibitors, corrosion indicators, antioxidants, metal deactivators, rheology modifiers, fillers such as fumed silica or specialty clays such as attapulgites, castor oil based thixotropes and the like, and hydrocarbon resins. Several types of antioxidants can be used, either primary antioxidants like hindered phenols or secondary antioxidants like phosphite derivatives or blends thereof.

Any hydrocarbon resin compatible with the S block of the polymer may be utilized, such as Kristalex™ 5140, or a rosin ester Sylvares™ SA-140. Examples of colorimetric indicators include the type for use in the detection of metallic ions, e.g., a rare earth salt, a lithium salt. an alkali salt of dithiozone or of rubeanic acid chelating agent. In one embodiment, the indicator is used to in conjunction with an absorbent carrier then incorporated into the filling composition.

The optional additives can be added in amounts ranging from 0.001 wt. % to 20 wt. % based on the total weight of the filling composition. In one embodiment, the amount of optional additives range from 0.5 to 4.0 wt. %. For example, an antioxidant can be added in an amount of 0.5-1.0 wt. %.

Preparation Methods:

The filling composition comprising the block copolymer, an oil, and optionally additives, can be prepared using any suitable method. For example, heating the oil (e.g., mineral oil) to a temperature of at least 120° C. and then dissolving the block copolymer into the preheated oil with high shear mixing for a suitable time and at a sufficient temperature to produce a homogeneous mixture. Alternatively, the components (e.g, block copolymer, oil, optional additives) can mixed together at low shear at room temperature or at a higher temperature. The mixture can then be heated to 120° C.-180° C. depending on the type of oil employed and the mixing speed, until the block copolymer is completely dissolved in the oil. The filling composition can then be cooled to 25° C. under vacuum to remove any entrapped air bubbles.

Properties:

With the use of SBC having excellent compatibility with mineral oils, helps prevent oil bleed out at high temperatures. The filling composition also has a viscosity sufficiently low to be easily introduced into the tubes (of a cable) during the manufacturing process, and to allow a substantially free relative movement of the fibers inside the tube but sufficiently high in order to oppose any sufficient physical barrier being present.

The composition has a low shear rate viscosity (e.g., 25° C. and 6/s) from 10,000 centipoise (cps) to 750,000 cps; alternatively from 20,000 cps to 500,000 cps; alternatively from 10,000 cps to 60,000 cps; alternatively from 100,000 cps to 300,000 cps; or alternatively from 20,000 cps to 50,000 cps.

The composition has a middle shear rate viscosity (e.g., 25° C. and 50/s) from 4,000 cps to 100,000 cps; alternatively from 5,000 cps to 80,000 cps; alternatively from 8,000 cps to 75,000 cps; alternatively from 3,000 cps to 9,000 cps, alternatively from 5,000 cps to 4,800 cps, or alternatively from 4,400 cps to 8,000 cps.

The composition has a high shear rate viscosity (e.g., 25° C. and 200/s) from 3,000 cps to 20,000 cps, or alternatively from 3,000 cps to 10,000 cps, or alternatively from 4,000 cps to 8,000 cps.

The composition can be characterized by a thixotropic ratio (ratio of viscosity at high shear rate/viscosity at low shear rate) from 2 to 10, or alternatively from 2.5 to 8.0, or alternatively from 3.0 to 6.0.

The composition is characterized by a drop point of >=150° C., or >=200° C., or from 200° C. to 300° C., or from 210° C. to 250° C.

The composition is further characterized by a cone penetration at 25° C. of <=500 deci-millimeter (dmm), preferably <=400 dmm, and most preferably <=350 dmm.

The filling composition is further characterized by an oil separation at 80° C. from 0.001% to 80%, alternatively from 0.001% to less than 2%, or alternatively less than 0.1%. The oil separation at 100° C. is less than 0.5%.

Applications:

The filling composition can be pumped into cables in high-speed optical cable manufacturing lines. The composition can also function as a component of flooding gels. Additional non-limiting examples of materials that may include a filling composition of the type includes heat transfer fluids and the like.

EXAMPLES

One or more of the following tests are employed in the examples:

Viscosities and flow curves are measured according to DIN 53019 at 6/s, 50/s and 200/s as Pascal-second or Pa·s or centi Poise (cps).

Molecular weights are polystyrene equivalent, or apparent molecular weights and measured by Gel Permeation Chromatography (GPC), using polystyrene calibration standards, such as is done according to ASTM D5296.

The polystyrene content (PSC) is determined using any suitable methodology such as proton nuclear magnetic resonance (NMR).

Cone penetration is determined using a penetrometer in accordance with ASTM 937, GBT 269-91 at temperatures of 25±2° C.

Oil separation is determined according to ASTM 6184, FED 321.3 at 80° C. and 100° C. for 24 hours.

Drop point can be determined in accordance with ASTM D 566.

The polymers used in the Examples are shown in Table 1:

TABLE 1

| Polymer | Structure | PS content (% w) | PS block size (real) | EP-block size (real) |
|---|---|---|---|---|
| Comparative | S-EP | 35 | 35 | 65 |
| A | S-EP | 48 | 90 | 94 |
| B | S-EP | 44 | 70 | 88 |

Examples 1-3

Filling compositions were prepared with 8 wt. % polymer, 0.1 wt % of an anti-oxidant, and the remainder a medicinal grade white oil (68/32 paffinic/naphthenic) having a kinematic viscosity at 40° C. of 65 mm$^2$/s, a density at 15° C. of 863 kg/m$^3$, a pour point of −12° C., a flash point of 240° C. and a viscosity index of 100. The mixture of oil and antioxidant was heated to 110° C. for the Comparative Examples, 180° C. for Polymer A, and 140° C. for Polymer B, then polymer was added and mixed under low speed (500 rpm) until the polymer dissolved. Properties of the compositions are listed in Table 2:

TABLE 2

| Polymer | Mixing time | Drop point (° C.) | Cone Penetration 25° C. (dmm) | Viscosity 6/s (Pa · s) | Viscosity 200/s (Pa · s) | Thixotropic Ratio Vis 6/Vis 200 |
|---|---|---|---|---|---|---|
| Compare | 35 | 190 | 342 | 23 | 4.8 | 4.7 |
| A | 48 | 241 | 318 | 20 | 5.8 | 3.4 |
| B | 44 | 219 | 320 | 22.5 | 6.0 | 3.8 |

Examples 4-6

Filling compositions were prepared with 8 wt. % polymer, 0.1 wt % of an anti-oxidant, and the remainder a Group II base oil from Handi Sunshine. The oil has a viscosity index of ≥95, a kinematic viscosity at 40° C. ranging from 28.0 to 34.0 mm$^2$/s, a density at 20° C. of 843.5 kg/m$^3$, a pour point of ≤−20° C., and a flash point of ≥200° C. The mixture of oil and antioxidant was heated to 120° C. for the Comparative Examples and 140° C. for Polymer A and B, and then polymer was added and mixed under high speed (4000 rpm) for 1 hour until the polymer dissolved. Properties of the compositions are listed in Table 3:

TABLE 3

| Polymer | Drop point (° C.) | Oil Separation 80° C. | Oil Separation 100° C. | Viscosity 6/s (Pa · s) | Viscosity 50/s (Pa · s) | Viscosity 200/s (Pa · s) | Thixotropic Ratio Vis6/Vis200 |
|---|---|---|---|---|---|---|---|
| Compare | 179.5 | 0 | 0 | 22.8 | 49 | 4.2 | 5.4 |
| A | 237.5 | 0 | 0 | 27.2 | 7.8 | 4.4 | 6.2 |
| B | 223 | 0 | 0 | 29.6 | 7.2 | 5.0 | 6.0 |

The Examples show that Polymers A and B provide filling compositions with superior retention of performance at high temperatures, with increased drop point temperature while exhibiting acceptable viscosity within an acceptable range of processing temperatures, e.g., 140° C. for Group II oil.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A filling composition comprising:
   a selectively hydrogenated isoprene-styrene block copolymer having a structure S-EP with at least 44 wt. % polystyrene content, a total diblock apparent molecular weight of at least 160 kg/mole, the polystyrene block S has a true molecular weight in the range of 60 to 110 kg/mole, and the polyisoprene block (EP) has a true molecular weight in the range of 80-100 kg/mole;
   80 wt. % to 96 wt. % of an oil selected from a paraffinic oil, oil-enriched in paraffin, a mineral oil, a Fischer-Tropsch derived oil, a synthetic oil, or mixtures thereof;

optional additives; and
wherein the filling composition has a thixotropic ratio of 2-10, a drop point of at least 200° C., and a cone penetration at 25° C. of less than 400 dmm.

2. The filling composition of claim 1, wherein the polystyrene block S having a true molecular weight of 70-75 kg/mole.

3. The filling composition of claim 1, wherein the selectively hydrogenated isoprene-styrene block copolymer is dissolvable in the oil at a temperature of less than 185° C.

4. The filling composition of claim 3, wherein the selectively hydrogenated isoprene-styrene block copolymer is dissolvable in the oil at a temperature in the range of 125-145° C.

5. The filling composition of claim 1, wherein the composition has a drop point of at least 210° C.

6. The filling composition of claim 1, wherein the composition has an oil separation at 100C from 0% to about 2%.

7. The filling composition of claim 1, wherein the composition has a viscosity at 25° C. and 50/s between about 10,000 to 60,000.

8. The filling composition of claim 1, wherein the selectively hydrogenated isoprene-styrene block copolymer is present in an amount from 4-20 wt. %, based on the total weight of the composition.

9. The filling composition of claim 1, wherein the optional additives comprise at least one of a corrosion inhibitor, a colorimetric indicator, an antioxidant, a metal deactivator, a rheology modifier, a hydrocarbon resin, fumed silica, organophillic clay, and combinations thereof.

10. The filling composition of claim 9, wherein the colorimetric indicator is selected from the group of rare earth salts, lithium salts, alkali salts of dithiozone, a rubeanic acid chelating agent, and mixtures thereof.

11. The filling composition of claim 1, wherein the oil is a paraffinic oil having more than 90 percent saturates, less than 0.03 percent sulfur and with a viscosity index of 80 to 120.

12. A cable comprising the filling composition of claim 1, where the filling composition provides protection from water ingress or corrosion.

13. A method for making a filling composition comprising dissolving a selectively hydrogenated isoprene-styrene block copolymer in an oil selected from a paraffinic oil, oil-enriched in paraffin, a mineral oil, a Fischer-Tropsch derived oil, a synthetic oil, or mixtures thereof,
wherein the selectively hydrogenated isoprene-styrene block copolymer having a structure S-EP with at least 44 wt. % polystyrene content, a total diblock apparent molecular weight of at least 160 kg/mole, the polystyrene block S has a true molecular weight in the range of 60 to 110 kg/mole, and the polyisoprene block (EP) has a true molecular weight in the range of 80-100 kg/mole;
wherein the oil is present in an amount of 80 wt. % to 96 wt. %, based on the total weight of the composition; and
wherein the filling composition has a thixotropic ratio of 2-10, a drop point of at least 200° C., and a cone penetration at 25° C. of less than 400 dmm.

14. The method of claim 13, wherein the oil is a paraffinic oil having more than 90 percent saturates, less than 0.03 percent sulfur and with a viscosity index of 80 to 120, and wherein the selectively hydrogenated isoprene-styrene block copolymer is dissolved in the oil at a temperature of less than 180° C.

* * * * *